(12) United States Patent
Thakare et al.

(10) Patent No.: US 11,716,380 B2
(45) Date of Patent: Aug. 1, 2023

(54) SECURE SELF-CONTAINED MECHANISM FOR MANAGING INTERACTIONS BETWEEN DISTRIBUTED COMPUTING COMPONENTS

(71) Applicant: salesforce.com, inc., San Francisco, CA (US)

(72) Inventors: Shrikant Thakare, Burlington, MA (US); Shivakarthik Subramanyam, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 172 days.

(21) Appl. No.: 17/160,478

(22) Filed: Jan. 28, 2021

(65) Prior Publication Data
US 2022/0239732 A1 Jul. 28, 2022

(51) Int. Cl.
*G06F 15/167* (2006.01)
*H04L 67/1061* (2022.01)
*H04L 9/32* (2006.01)
*G06F 16/955* (2019.01)
*G06F 16/901* (2019.01)
*H04L 9/08* (2006.01)
*H04L 9/40* (2022.01)

(52) U.S. Cl.
CPC ...... *H04L 67/1065* (2013.01); *G06F 16/9024* (2019.01); *G06F 16/9566* (2019.01); *H04L 9/085* (2013.01); *H04L 9/3242* (2013.01); *H04L 63/12* (2013.01)

(58) Field of Classification Search
CPC ... H04L 67/1065; H04L 9/085; H04L 9/3242; H04L 63/12; H04L 63/1466; H04L 67/02; H04L 67/10; G06F 16/9024; G06F 16/9566; G06F 9/465; G06F 21/12
See application file for complete search history.

(56) References Cited

U.S. PATENT DOCUMENTS

| 8,572,129 B1 * | 10/2013 | Lee ................... G06Q 50/01 707/798 |
| 9,129,039 B2 * | 9/2015 | Brettin ............. G06F 16/9024 |
| 11,256,759 B1 * | 2/2022 | Chen ............... G06F 16/9024 |
| 11,403,643 B2 * | 8/2022 | Shekhar ............ G06Q 30/0601 |

(Continued)

*Primary Examiner* — Phuoc H Nguyen
(74) *Attorney, Agent, or Firm* — Butzel Long

(57) ABSTRACT

Methods, computer readable media, and devices for securely managing interactions between distributed components are provided. One method may include generating a first interaction identifier based on a first component identifier and data to be shared with a second component, storing the first interaction identifier in an interaction data store of the first component, sending a request to the second component including the first component identifier, the first interaction identifier, and the data to be shared with the second component, creating a graph node in an interaction relationship data store based on the first interaction identifier, receiving a response from the second component including a second component identifier, a second interaction identifier, and response data, and adding a relationship edge in the interaction relationship data store connecting the graph node based on the first interaction identifier with a graph node based on the second interaction identifier.

12 Claims, 9 Drawing Sheets

(56) References Cited

U.S. PATENT DOCUMENTS

| | | | |
|---|---|---|---|
| 2010/0274815 A1* | 10/2010 | Vanasco | G06F 16/9024 |
| | | | 707/798 |
| 2014/0025702 A1* | 1/2014 | Curtiss | G06Q 30/02 |
| | | | 707/769 |
| 2019/0179858 A1* | 6/2019 | Douze | G06F 16/90335 |
| 2019/0189126 A1* | 6/2019 | Liu | G10L 15/30 |
| 2022/0161817 A1* | 5/2022 | Anastassov | G01C 21/3841 |
| 2022/0272620 A1* | 8/2022 | Ninglekhu | H04W 88/02 |

* cited by examiner

| lid ～ 122 | Value ～ 124 |
|---|---|
| a0ffb0ea92c975785aeb68d4080e6ca57181f0c864fc8466a975c5edb732b443 | { "user": "John Doe", "fooUrl": "http://bar.com", "metrics": { "frequency": 123, "miss" : 12, "retries": 2}, "team" : "dynamo" } |

| Field | Description | Example |
|---|---|---|
| component_id | unique id which identifies the component in the distributed namespace. e.g uuid4 or can be other unique id | comp1-8baf-433b-82eb-8c7fada847da — 142 |
| component_name | Name of component | MyStoreFrontEnd — 144 |
| iid_disovery_url | Namespaced url which can be used to lookup data using iid. Returns all data in json format. Each component provides this url. | https://foo.bar.disovery/{namespace}/{component_id}/{iid} — 146 |
| iid_response_type | Object type of iid response payload. Helps peer component to unmarshall the object contents. | json — 148 |

| Component ID | Component Secret | Authorized Peer Component ID 1 | Authorized Peer Component ID 2 | Authorized Peer Component ID n |
|---|---|---|---|---|
| comp1-8baf-433b-82eb-8c7fada847da | 5ijxcv6$dop6vb | comp3-nsdhs-433b-ff2eb-8c7fff49da | comp4-3c1a-480b-8e0a-1475bf33b9ce | comp5-3940-4c8a-b0a9-c36f82e3912f |
| comp4-3c1a-480b-8e0a-1475bf33b9ce | bh6677899909 | comp5-3940-4c8a-b0a9-c36f82e3912f | comp3-nsdhs-433b-ff2eb-8c7fff49da | comp8-d171-449a-ad9a-5faec3dc9c43 |

172

174

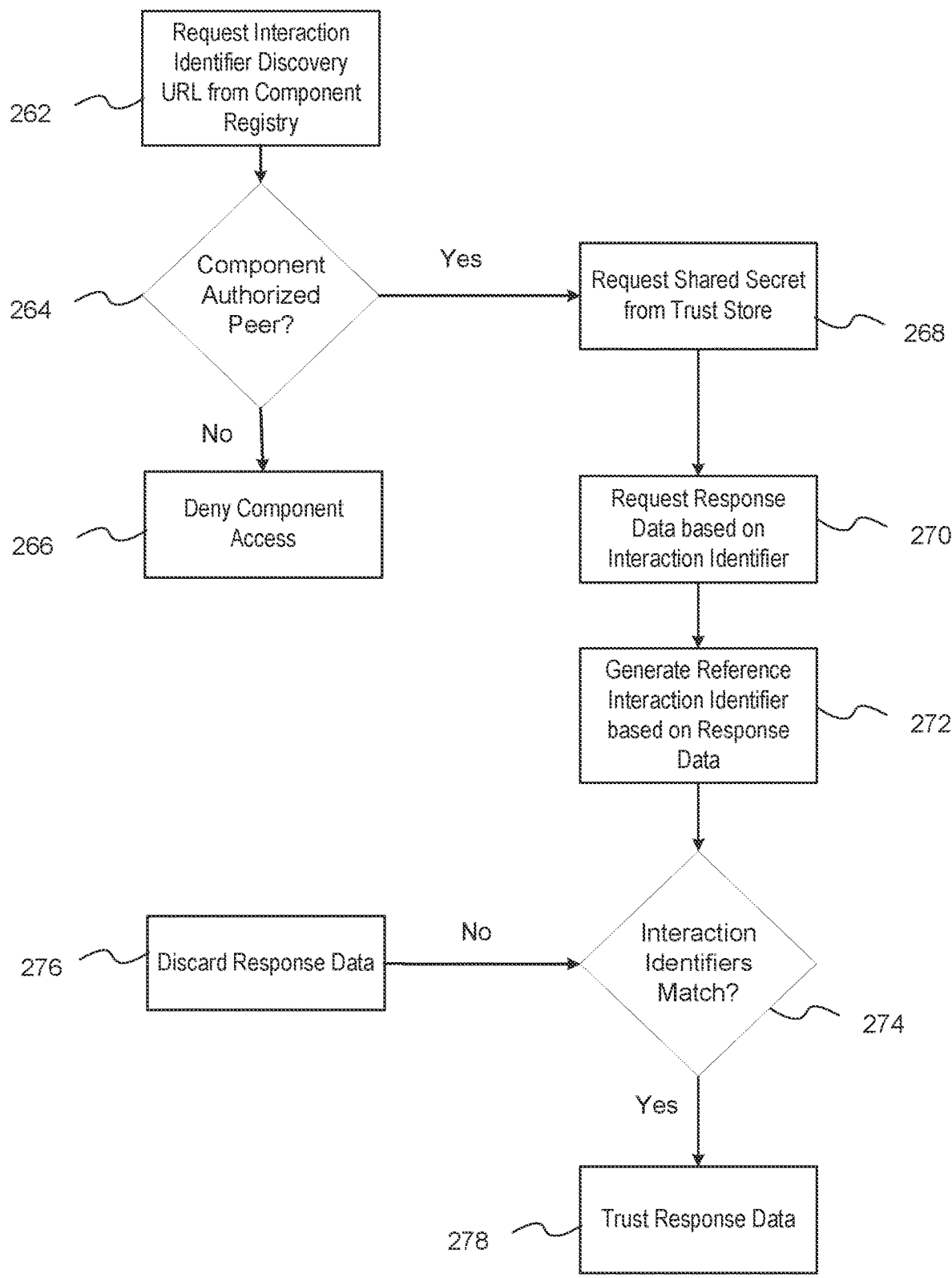

SECURE SELF-CONTAINED MECHANISM FOR MANAGING INTERACTIONS BETWEEN DISTRIBUTED COMPUTING COMPONENTS

TECHNICAL FIELD

One or more implementations relate to the field of distributed computing components; and more specifically, to securely managing interactions between such distributed components.

BACKGROUND

In a distributed system, an operation with a specific goal may span across multiple components. Each of these components may use different implementation technology and may exchange data in the request-response paradigm (e.g., an interaction) via an application programming interface (API). Since there may be numerous such interactions between various components during an operation's lifecycle, a system may be needed that saves the interaction data to be retrieved later using an efficient mechanism and that persists the relationship between these interactions efficiently.

Components involved in an operation may also need access to data during specific peer component interaction in order to get the point in time view of the operation execution. A component may need a way to validate that the data retrieved from another component has not been tampered. A component may need a control mechanism to share interaction data with only trusted peer components and a way to map the component's sub-processes to a parent component process.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 1B illustrates a sample interaction identifier according to some example implementations.

FIG. 1C illustrates a sample schema for a system wide component registry according to some example implementations.

FIG. 1D illustrates a sample schema for a system wide trust store according to some example implementations.

FIG. 2C is a flow diagram illustrating a method for use with secure self-contained mechanism for managing interactions between distributed components according to some example implementations.

DETAILED DESCRIPTION

Figure 1A:
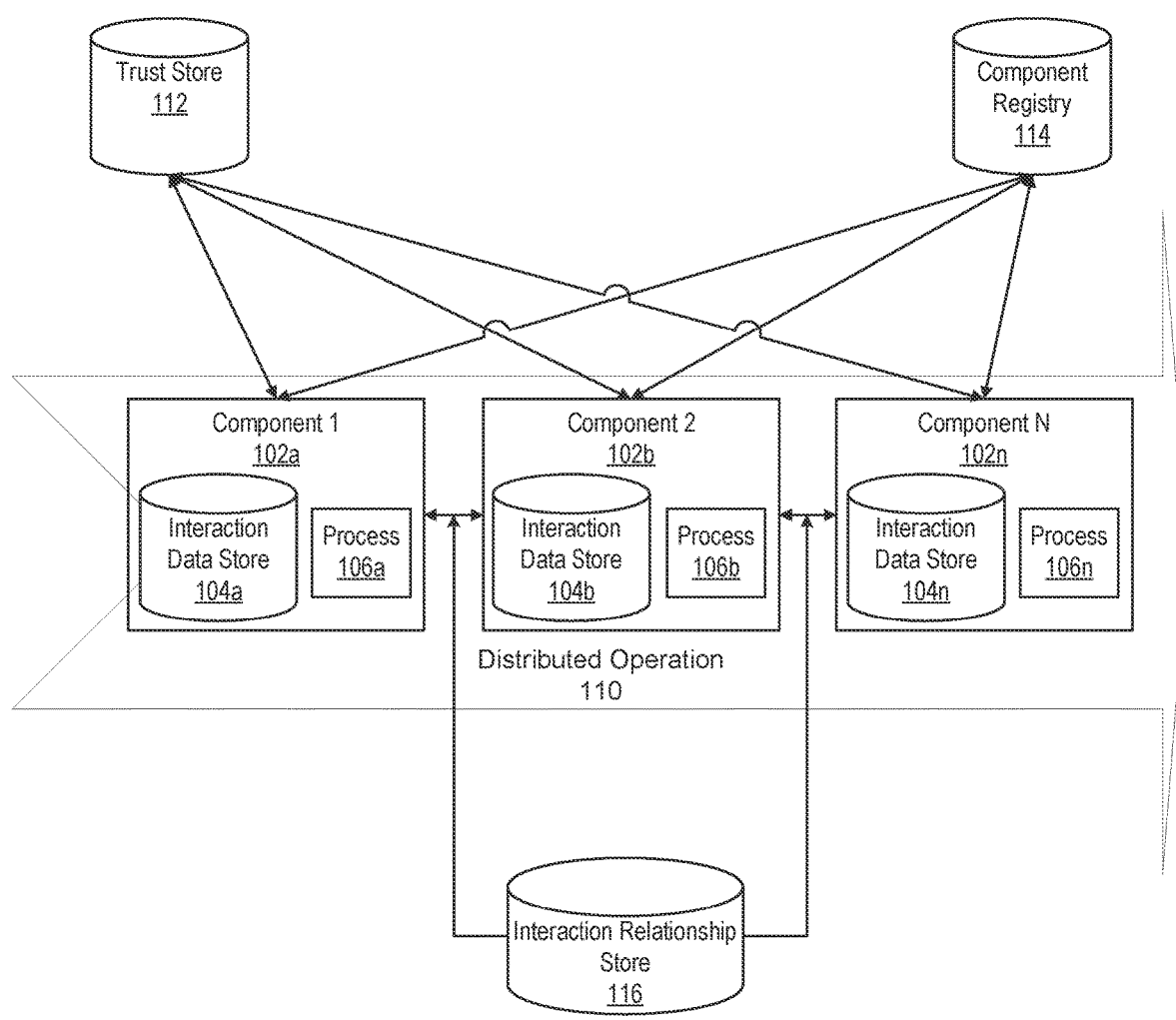
FIG. 1A is a block diagram illustrating a system utilizing secure self-contained mechanism for managing interactions between distributed components according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Various components may be involved in a distributed operation with each component performing a corresponding process. For example, a distributed operation may be an executable process and each component may be a subprocess, such as a function or subroutine. As another example, a distributed operation may be a process, such as order fulfillment, and each component may be a different element within the process, such as inventory check, backfill, item retrieval, item packing or the like. As still another example, a distributed operation may be a task to be performed in parallel or otherwise utilizing threading technology and each component may represent a parallel path or individual thread. As such, a component may be an executable sub-process, an executable process, a processor, a server, a database, or the like.

As part of executing a process, a component may generate data that needs to be shared with one or more other components. The component may need a way to store the generated data internally as well as securely share the generated data with only trusted peers. For example, component 1 may generate data that will only be shared with component 2 while component 2 may generate data that will only be shared with component 3. Component 1 may need, for example, a way to identify component 2 as a trusted peer that has access to the generated data. In addition, component 2 may need, for example, a way to validate the integrity of the data received from component 1.

In various implementations, each component involved in executing an operation that spans a distributed system may be considered as a node in a graph and each interaction between components may be considered an edge between corresponding nodes in the graph. The various components may need to exchange data generated as part of the operation in a secure manner. Each component may need to identify trusted peer components and, when a component receives data, the component may need to validate the integrity of the data (e.g., perform non-repudiation or otherwise confirm the data has not been altered).

In one example, component 1 may generate a unique interaction identifier based on data generated by a process performed by component 1. For example, component 1 may be an inventory quantity function which may generate data such as a number of available units of inventory items. In this example, component 1 may utilize the interaction identifier to store the generated data and may send the interaction identifier to a peer component, component 2 for example, as an identity of the data. Component 2 may, for example, retrieve the generated data from component 1 using the interaction identifier. Component 2 may also, for example, validate the integrity of the process data using the interaction identifier. Continuing the example, component 2 may be a backfill function that determines whether and how many additional units of an inventory item should be ordered based on the number of available units generated by component 1.

Further in this example, component 1 may determine that component 2 is a trusted peer and allowed to retrieve the data based on a system wide trust store. The system wide trust store may include, for example, a list of all authorized peer components as well as a shared secret to be shared among the authorized peer components. In this example, an entry for component 1 in the trust store may include component 2 (but not component 3) as an authorized peer and component 1's shared secret to be shared with component 2. Similarly, an entry for component 2 in the trust store may include component 1 and component 3 as authorized peers and component 2's shared secret to be shared with components 1 and 3. For example, component 3 may be a backfill order receiving function that generates a status of whether additional received units equal a number of units ordered as a result of the backfill function of component 2 by referencing an additional units count generated by component 2.

Continuing this example, components 1 and 2 may each create a record of the interaction in a system wide interaction identifier relationship store in order to create an immutable interaction chain for any given distributed operation. For example, component 1 may add a directed graph edge between a graph node corresponding to component 1 and a graph node corresponding to component 2 (e.g., an arrow pointing from component 1's node to component 2's node). Component 2 may also, for example, add a directed graph edge between the two component's nodes (e.g., an arrow pointing from component 2's node to component 1's node).

Additionally in this example, a component, such as component 2, may also link the component's sub-processes to a parent component's interaction identifier, such as component 1's interaction identifier for this interaction. In this way, a parent interaction identifier may give an identify to sub-processes that may be able to map a child component's operation flow to the parent component's data.

Implementations of the disclosed subject matter provide methods, computer readable media, and devices for a secure self-contained mechanism for managing interactions between distributed components. In various implementations, a method may include generating a first interaction identifier by a first component, the first interaction identifier based on a component identifier of the first component and data to be shared with a second component, storing the first interaction identifier in an interaction data store of the first component, sending a request to the second component including the component identifier of the first component, the first interaction identifier, and the data to be shared with the second component, creating a graph node based on the first interaction identifier in an interaction relationship data store accessible by components in the distributed system, receiving a response from the second component including a component identifier of the second component, a second interaction identifier, and response data, and adding a relationship edge connecting the graph node based on the first interaction identifier with a graph node based on the second interaction identifier in the interaction relationship data store.

In some implementations, the method may further include subsequently retrieving the response data from the second component by requesting an interaction identifier discovery uniform resource locator (URL) corresponding to the second component from a component registry, requesting a shared secret corresponding to the second component from a trust store, requesting the response data from the second component by submitting the second interaction identifier via the interaction identifier discovery URL corresponding to the second component, generating a reference interaction identifier based on the response data received from the second component, and comparing the reference interaction identifier and the second interaction identifier to determine an integrity of the received response data.

In various implementations, generating a first interaction identifier may include generating a keyed cryptographic hash of the data to be shared with the second component, the keyed cryptographic hash being based on a shared secret shared between the first and second components.

In some implementations, the method may further include registering the first component in a component registry by providing the component identifier of the first component, a component name of the first component, an interaction identifier discovery universal resource location (URL) of the first component, and an interaction identifier response type.

In some implementations, the method may further include creating an entry corresponding to the first component in a trust store accessible by components in the distributed system, the entry including the component identifier of the first component, a shared secret, and one or more peer component identifiers, each peer component identifier being a component authorized to interact with the first component.

FIG. 1A illustrates a system 100 utilizing a secure self-contained mechanism for managing interactions between distributed components according to some example implementations. In various implementations, a distributed operation 110 may include a number of components, such as component 1 102a, component 2 102b, and component N 102n. Each component may include an interaction data store and a process. For example, component 1 102a may include interaction data store 104a and process 106a. Similarly, component 2 102b may include interaction data store 104b and process 106b while component N 102n may include interaction data store 104n and process 106n. Although system 100 of FIG. 1 only shows three components within a single distributed operation, this is only for simplicity. System 100 of FIG. 1 may include a plurality of distributed operations and each component may participate in any number of distributed operations. System 100 may also include a trust store 112, a component registry 114, and an interaction relationship store 116.

In various implementations, each component may register with component registry 114. As described in greater detail below in relation to FIG. 1C, component registry 114 may include, for example, an entry for each component in distributed operation 110. Each entry may include, for example, a component identifier, a component name, an interaction identifier discovery uniform resource locator (URL), and an interaction identifier response type.

In various implementations, trust store 112 may include, for example, an indication of which components may be authorized peer components of the various components within the distributed operation. As described in greater detail below in relation to FIG. 1D, trust store 112 may include, for example, an entry for each component in distributed operation 110. For example, an entry may include a component identifier of the component for which the entry corresponds, a component secret of the component, and one or more component identifiers of peer components authorized to interact with the component.

In various implementations, interaction relationship store 116 may include, for example, a graph depicting component interaction flow as well as an interaction graph. In some implementations, the component interaction flow graph may include, for example, a graph node corresponding to each component and graph edges corresponding to various interactions between the components. In some implementations, the interaction graph may include, for example, a graph node corresponding to each interaction within the distributed operation and graph edges providing an indication of hierarchy/order of interactions and/or a direction of flow of an interaction.

FIG. 1B illustrates a sample interaction identifier 120 generated as part of a secure self-contained mechanism for managing interactions between distributed components according to some example implementations. In particular, interaction identifier 122 may be an identifier generated based on value 124. In various implementations, value 124 may be data to be shared with a peer component within a distributed operation. For example, component 1 may generate value 124 as part of a process performed by component 1. In the example shown in FIG. 1B, value 124 may be a set of name:value pairs. However, value 124 may be any value, set of values, or any representation of data generated as a result of a process. In turn, component 1 may, for example, share value 124 with component 2. In order to share value 124 with component 2, component 1 may, for example, generate interaction identifier 122 based on value 124. In various implementations, interaction identifier 122 may be generated by utilizing an encoding algorithm with minimum collisions. For example, a hashed-based message authentication code (HMAC) may be generated by passing value 124 through a cryptographic hash function using a secret cryptographic key. In one example, interaction identifier 122 may be generated using the formula $iid_{(c)} = f_1^n \, f(value_{(n)}) * secret_{(c)}$, where c is the corresponding component within a distributed system, n is the number of data points of the process that the component persists and is ready to share, f is a robust encoding algorithm with minimum collisions such as HMAC with SHA256, and secret is a component-specific secret key used in generating an HMAC. In various implementations, the secret may only be shared with trusted peer components within the distributed operation. More generally, an interaction identifier may represent, for example, a keyed hash of data generated by a component and, in order to share the generated data, the component may share the interaction identifier with one or more trusted peer components.

FIG. 1C illustrates a sample schema 140 for a system wide component registry of a secure self-contained mechanism for managing interactions between distributed components according to some example implementations. In various implementations, each entry in a system wide component registry, such as component registry 114 of FIG. 1A, may include a component_id field 142, a component_name field 144, an iid_discovery_url field 146, and an iid_response_type field 148. Component_id field 142 may include, for example, a unique identifier which identifies the component within a distributed namespace. Component_name field 144 may include, for example, a name of the corresponding component. Iid_discovery_url field 146 may include, for example, a namespace URL which can be used to lookup data using an interaction identifier, such as interaction identifier 122 of FIG. 1B. In some implementations, each component provides their own corresponding iid_discovery_url which, when accessed by a peer component, returns all data in javascript object notation (JSON) format. Iid_response_type field 148 may include, for example, an object type of the corresponding interaction identifier response payload. In various implementations, a system wide component registry, such as component registry 114 of FIG. 1A, may include an entry for each component within the distributed operation and each entry may follow schema 140.

FIG. 1D illustrates a sample schema 160 for a system wide trust store of a secure self-contained mechanism for managing interactions between distributed components according to some example implementations. In various implementations, each entry in a system wide trust store, such as trust store 112 of FIG. 1A, may include a component ID field 162, a component secret field 164, and one or more authorized peer component ID fields 166a . . . n. Component ID field 162 may include, for example, the component identifier of the component corresponding to the entry. Component secret field 164 may include, for example, a component secret to be shared only with trusted peer components within a distributed operation. Authorized peer component ID fields 166a . . . n may include, for example, the component identifier of each peer component trusted to interact with the component corresponding to the entry. For example, trust store entry 172 corresponds to component 1 and trust store entry 174 corresponds to component 4. In this example, component 1 may have component 3, component 4, and component 5 as authorized peers while component 4 may have component 5, component 3, and component 8 as authorized peers. Of note, while component 4 may be an authorized peer of component 1, component 1 may not be an authorized peer of component 4. As such, component 1 may share data generated by component 1 with component 4, but component 4 may not share data generated by component 4 with component 1. More generally, each entry in a system wide trust store, such as trust store 112 of FIG. 1A, may represent one or more unidirectional interactions from the component ID included in component ID field 162 to the authorized peer component IDs included in authorized peer component ID fields 166a . . . n and the one or more unidirectional interactions may utilize the shared secret included in component secret field 164.

Figure 1E:
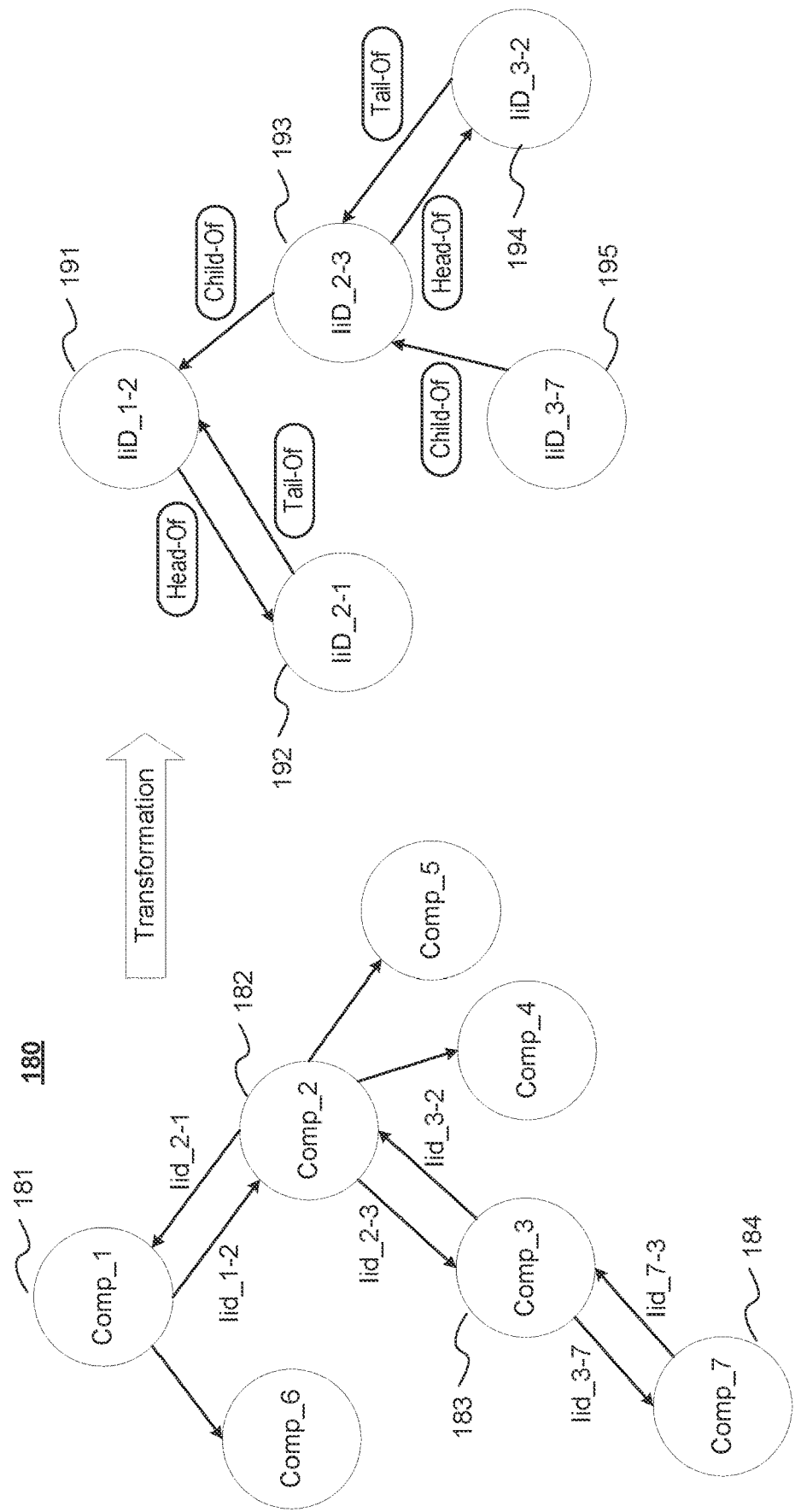
FIG. 1E illustrates a sample of a component interaction flow and an interaction graph within a system wide interaction identifier relationship store according to some example implementations.

FIG. 1E illustrates a sample of a component interaction flow 180 and an interaction graph 190 within a system wide interaction identifier relationship store of a secure self-contained mechanism for managing interactions between distributed components according to some example implementations. In various implementations, component interaction flow 180 may include, for example, each component within a distributed system represented as a node and unidirectional interactions between components represented as edges connecting corresponding nodes. For example, component 1 181, component 2 182, component 3 183, and component 7 184 may participate in a particular distributed operation, such as those previously disclosed herein. In various implementations, interaction graph 190 may include, for example, each unidirectional interaction represented as a node and relationships represented as edges connecting corresponding nodes. For example, interaction identifier nodes 191, 192, 193, 194, 195 corresponding to interaction identifiers IiD_1-2, IiD_2-1, IiD_2-3, IiD_3-2, and IiD_3-7 may be represented as nodes with the various edges representing relationships between the interactions, such as those previously disclosed.

In one example, component 1 181 may share data with component 2 182, component 2 182 may share data with component 3 183, and component 3 183 may share data with component 7 184. In order to share data with component 2 182, component 1 181 may generate interaction identifier IiD_1-2 based on the data to be shared and send interaction identifier IiD_1-2 to component 2 182. Component 1 181 may also create an interaction identifier node 191 corresponding to interaction identifier IiD_1-2 within the interaction graph 190. Component 2 182 may respond to component 1 181 by generating interaction identifier IiD_2-1 192 based on response data and sending interaction identifier IiD_2-1 192 to component 1 181. Component 2 may also create an interaction identifier node 192 corresponding to interaction identifier IiD_2-1 within the interaction graph 190 as well as create an edge from interaction identifier node 192 to interaction identifier node 191 with an edge type of tail-of indicating that component 2 responded to component 1 with interaction identifier IiD_2-1. After receiving the response from component 2, component 1 may create an edge from interaction identifier node 191 to interaction identifier node 192 with an edge type of head-of indicating that component 1 initiated the interaction.

Further in this one example, component 2 182 and component 3 183 may similarly exchange data and document the data exchange in the component interaction flow 180 and the interaction graph 190. For example, component 2 182 may generate interaction identifier IiD_2-3 based on data generated by component 2 182 and share interaction identifier IiD_2-3 with component 3 183. Component 2 182 may also create an interaction identifier node 193 in the interaction graph 190. In response to receiving interaction identifier IiD_2-3 from component 2 182, component 3 183 may generate interaction identifier IiD_3-2 based on response data and send interaction identifier IiD_3-2 to component 2 182. Component 3 183 may also create an interaction identifier node 194 and an edge from interaction identifier node 194 to interaction identifier node 193 with an edge type of tail-of. When component 2 182 receives interaction identifier IiD_3-2, component 2 182 may create an edge from interaction identifier node 193 to interaction identifier node 194 with an edge type of head-of. In this way, the system wide interaction identifier relationship store, such as interaction identifier relationship store 116 of FIG. 1A, may document the flow of interactions between the various components of a distributed operation (e.g., component interaction flow 180) as well as relationships between interaction identifiers within the distributed operation (e.g., interaction graph 190).

Figure 2A:
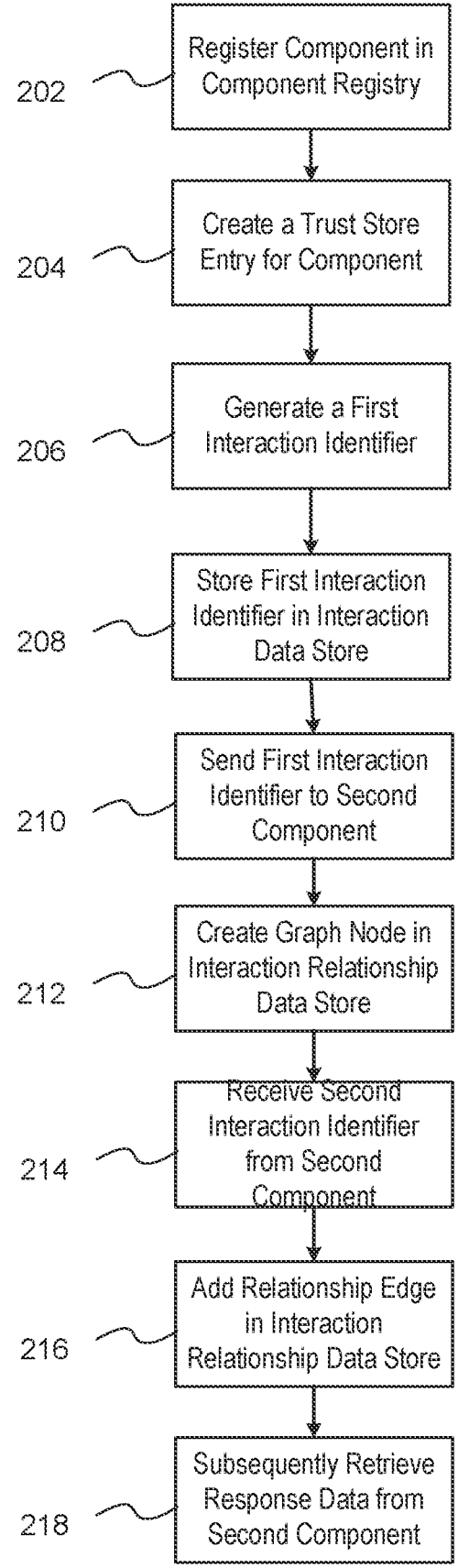
FIG. 2A is a flow diagram illustrating a method for use with secure self-contained mechanism for managing interactions between distributed components according to some example implementations.

FIG. 2A illustrates a method 200 for use in a secure self-contained mechanism for managing interactions between distributed components, as disclosed herein. The method 200 may be performed, for example, by a distributed system and/or components within a distributed system, such as components 102a . . . n in FIG. 1A. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a component may be registered in a component registry, such as component registry 114 of FIG. 1A. For example, a component ID, a component name, an interaction identifier discovery URL, and an interaction identifier response type corresponding to the component may be registered in the component registry. In various implementations, step 202 may be repetitively performed for each component within a distributed system.

In step 204, an entry for a component may be created in a trust store, such as trust store 112 of FIG. 1A. For example, an entry including a component ID and a component secret corresponding to the component as well as component IDs of peer components authorized to interact with the component may be created in the trust store. In various implementations, step 204 may be repetitively performed for each component within a distributed system.

In step 206, a component may generate a first interaction identifier. In various implementations, the first interaction identifier may be based on data generated by the component to be shared with one or more peer components. In some implementations, the first interaction identifier may be a keyed hash of the data to be shared. For example, the component may generate the first interaction identifier by performing a hash of the data to be shared with a secret key.

In step 208, a component may store the first interaction identifier in an interaction data store of the component. For example, component 1 102a of FIG. 1A may store an interaction identifier in interaction data store 104a. Of note, as described above in relation to FIG. 1B, the interaction identifier may be stored in conjunction with the generated data used to create the interaction identifier.

In step 210, a component may send the first interaction identifier to a second component. For example, the component may send the interaction identifier to a peer component authorized to interact with the component.

In step 212, a component may create a graph node in an interaction relationship data store, such as interaction relationship data store 116 of FIG. 1A. In various implementations, a component may create a node corresponding to the component in a component interaction flow, such as component interaction flow 180 of FIG. 1E, as well as a node corresponding to the first interaction identifier in an interaction graph, such as interaction graph 190 of FIG. 1E.

In step 214, a component may receive a second interaction identifier from a second component. For example, the component may receive the second interaction identifier from the second component in response to sending the first interaction identifier to the second component. In various implementations, the second interaction identifier may be based on response data to be shared with the component by the second component. In some implementations, the second interaction identifier may be a keyed hash of the response data. For example, the second interaction identifier may be created by performing a hash of the response data with a secret key.

In step 216, a component may add a relationship edge in an interaction relationship data store, such as interaction relationship data store 116 of FIG. 1A. In various implementations, a component may add an edge corresponding to the first interaction identifier in a component interaction flow, such as component interaction flow 180 of FIG. 1E, as well as an edge indicating a relationship type in an interaction graph, such as interaction graph 190 of FIG. 1E. For example, the component may add the edge corresponding to the first interaction identifier in the component interaction flow between a node corresponding to the component and a node corresponding to the second component. Similarly, the component, for example, may add the edge indicating a relationship type in the interaction graph between a node corresponding to the first interaction identifier and a node corresponding to the second interaction identifier.

In step 218, a component may subsequently retrieve response data corresponding to the second interaction identifier from the second component. For example, the component may submit the second interaction identifier to an interaction identifier discovery URL of the second component and may receive the response data as a result of the submission.

Figure 2B:
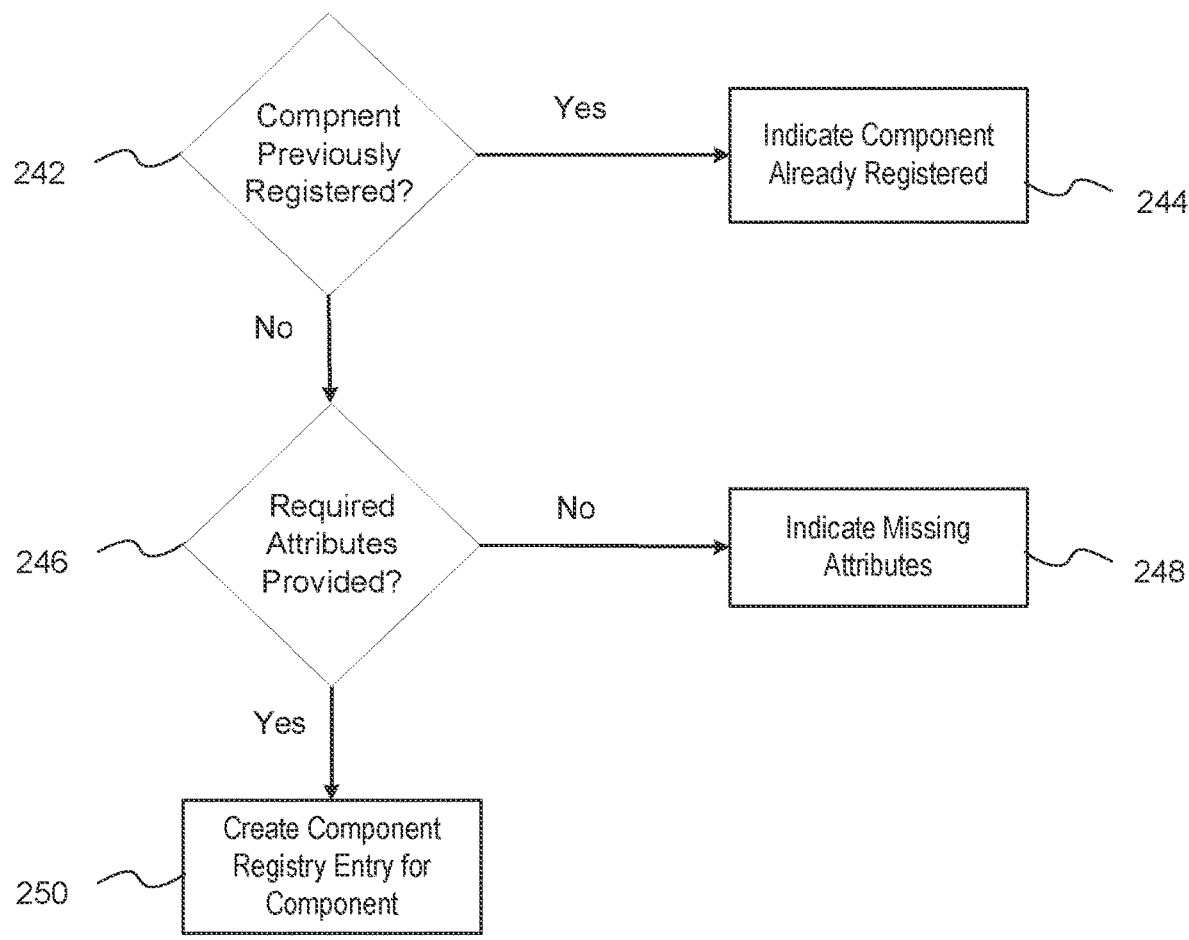
FIG. 2B is a flow diagram illustrating a method for use with secure self-contained mechanism for managing interactions between distributed components according to some example implementations.

FIG. 2B illustrates a method 240 for use with a secure self-contained mechanism for managing interactions between distributed components, as disclosed herein. The method 240 may be performed, for example, by a distributed system and/or components within a distributed system, such as components 102a . . . n in FIG. 1A. In various implementations, the steps of method 200 may be performed by a server, such as electronic device 300 of FIG. 3A or system 340 of FIG. 3B, and/or by software executing on a server or distributed computing platform. Although the steps of method 240 are presented in a particular order, this is only for simplicity. In various implementations, the method 240 may be performed as part of registering a component with a component registry, such as in step 202 of method 200 in FIG. 2A.

In determination step 242, a determination of whether a component was previously registered may be made.

If a component was previously registered (i.e., determination step 242="Yes"), an indication that the component was previously registered is sent in step 244. For example, if a component was previously registered, the component may be informed of the previous registration.

If a component was not previously registered (i.e., determination step 242="No"), the method may proceed to determination step 246. In determination step 246, a determination of whether required attributes were provided may be made.

If required attributes were not provided (i.e., determination step 246="No"), an indication of missing attributes may be provided in step 248. For example, if a component does not provide required attributes, the component may be informed of which required attributes were not provided.

If required attributes were provided (i.e., determination step 246="Yes"), an entry corresponding to the component may be created in step 250. For example, an entry corresponding to a component may be created in a component registry, such as component registry 114 of FIG. 1A.

FIG. 2C illustrates a method 260 for use with a secure self-contained mechanism for managing interactions between distributed components, as disclosed herein. The method 260 may be performed, for example, by a distributed system and/or components within a distributed system, such as components 102a . . . n in FIG. 1A. In various implementations, the steps of method 200 may be performed by a server, such as electronic device 300 of FIG. 3A or system 340 of FIG. 3B, and/or by software executing on a server or distributed computing platform. Although the steps of method 260 are presented in a particular order, this is only for simplicity. In various implementations, the method 260 may be performed as part of subsequently retrieving response data, such as in step 218 of method 200 in FIG. 2A.

In step 262, a component may request an interaction identifier discovery URL from a component registry, such as component registry 114 of FIG. 1A. For example, a component may submit a component identifier of a peer component to the component registry and the component registry may respond with the interaction identifier discovery URL corresponding to the peer component.

In determination step 264, a determination of whether a component is an authorized peer component is made. For example, a trust store, such as trust store 112, may be referenced to determine whether an entry for a peer component (i.e., component ID field contains identifier of peer component) includes an authorized peer component field containing a component identifier of the component.

If the component is not an authorized peer component (i.e., determination step 264="No"), then the component is denied access in step 266.

If the component is an authorized peer component (i.e., determination step 264="Yes"), then the method proceeds to step 268.

In step 268, a component may request a shared secret from a trust store, such as trust store 112 of FIG. 1A. For example, the component may submit a component identifier of a peer component to the trust store and the trust store may respond with the shared secret corresponding to the peer component.

In step 270, a component may request response data from a peer component based on an interaction identifier. In various implementations, the component may have previously received the interaction identifier from the peer component (e.g., second interaction identifier received as part of step 214 of method 200). In various implementations, the component may request response data by submitting the interaction identifier to the peer component via the interaction identifier discovery URL corresponding to the peer component (i.e., interaction identifier discovery URL requested as part of step 262) and the peer component may provide the response data in response to the submission.

In step 272, a component may generate a reference interaction identifier based on response data. For example, the component may generate the reference interaction identifier based on the response data received from the peer component. In various implementations, the reference interaction identifier may be generated by performing a keyed hash of the response data using the shared secret corresponding to the peer component.

In determination step 274, a determination of whether the reference interaction identifier matches the previously received interaction identifier is made. In one example, a component may have previously received the interaction identifier from the peer component (e.g., second interaction identifier received as part of step 214 of method 200). In this example, the component may compare the received second interaction identifier with the reference interaction identifier to determine if they match.

If the reference interaction identifier and previously received interaction identifier do not match (i.e., determination step 274="No"), then the response data is discarded in step 276. In various implementations, if the reference interaction identifier and previously received interaction identifier do not match, then the subsequently received response data may have been tampered with or otherwise may not be valid.

If the reference interaction identifier and previously received interaction identifier do match (i.e., determination step 274="Yes"), then the component may trust the response data in step 278. In various implementations, if the reference interaction identifier and previously received interaction identifier do match, then the subsequently received response data may be valid or otherwise not tampered with or altered.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
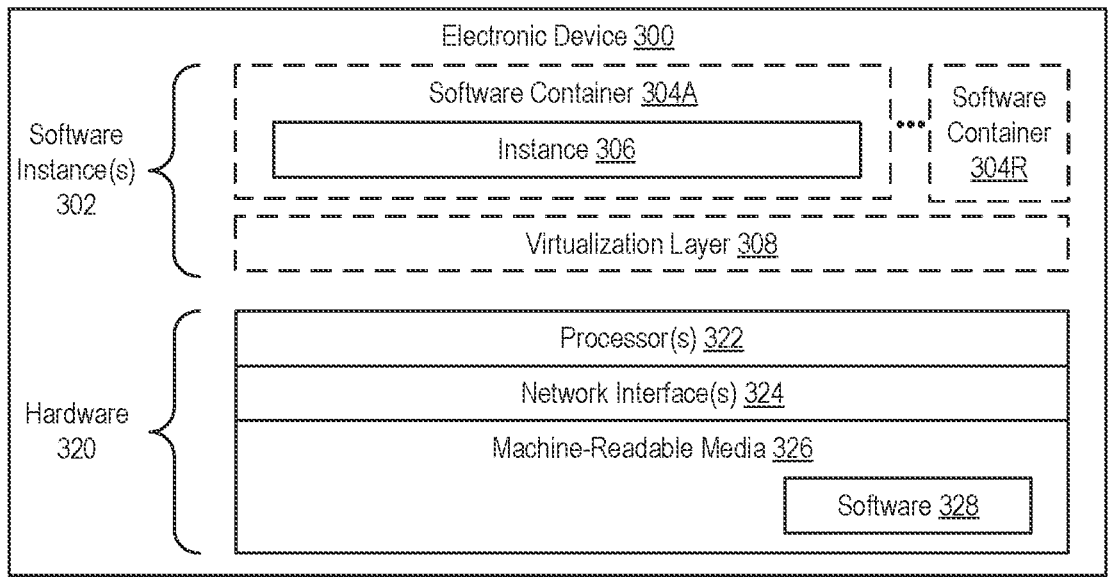
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and secure self-contained mechanism for managing interactions between distributed components may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
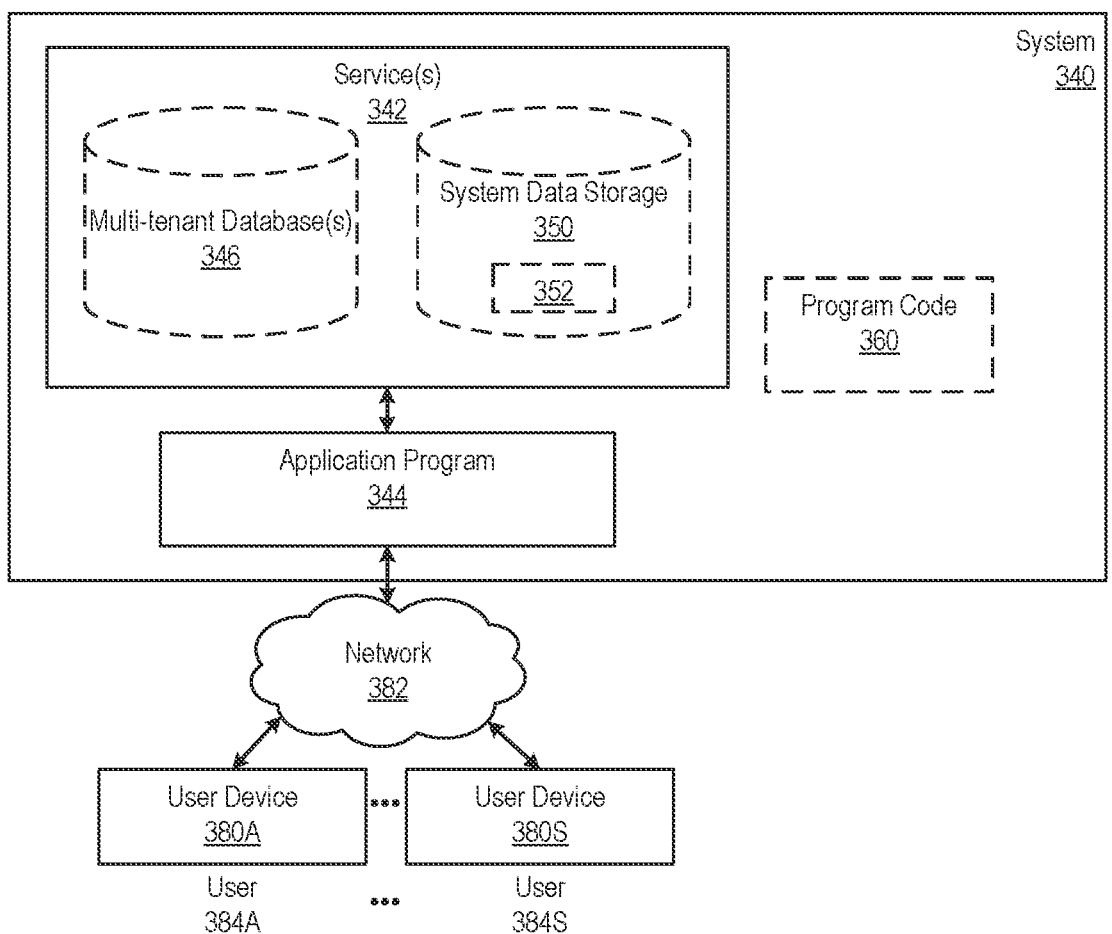
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a secure self-contained mechanism for managing interactions between distributed components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method comprising:
    generating, by a first component in a distributed system, a first interaction identifier based on:
        a component identifier of the first component; and
        data to be shared with a second component;
    storing the first interaction identifier in an interaction data store of the first component;
    sending a request to the second component, the request including the component identifier of the first component, the first interaction identifier, and the data to be shared with the second component;
    creating a graph node in an interaction relationship data store based on the first interaction identifier, the interaction relationship data store being accessible by components in the distributed system;
    receiving a response from the second component, the response including a component identifier of the second component, a second interaction identifier, and response data;
    adding a relationship edge in the interaction relationship data store, the relationship edge connecting the graph node based on the first interaction identifier with a graph node based on the second interaction identifier;
    subsequently retrieving the response data from the second component by:
        requesting an interaction identifier discovery uniform resource locator (URL) corresponding to the second component from a component registry;
        requesting a shared secret corresponding to the second component from a trust store;
        requesting the response data from the second component by submitting the second interaction identifier via the interaction identifier discovery URL corresponding to the second component;
        generating a reference interaction identifier based on the response data received from the second component; and
        comparing the reference interaction identifier and the second interaction identifier to determine an integrity of the received response data.

2. The computer-implemented method of claim 1, wherein generating a first interaction identifier comprises generating a keyed cryptographic hash of the data to be shared with the second component, the keyed cryptographic hash being based on a shared secret shared between the first and second components.

3. The computer-implemented method of claim 1, further comprising registering the first component in a component registry by providing the component identifier of the first component, a component name of the first component, an interaction identifier discovery universal resource location (URL) of the first component, and an interaction identifier response type.

4. The computer-implemented method of claim 1, further comprising creating an entry corresponding to the first component in a trust store accessible by components in the distributed system, the entry including the component identifier of the first component, a shared secret, and one or more peer component identifiers, each peer component identifier being a component authorized to interact with the first component.

5. A non-transitory machine-readable storage medium that provides instructions that, if executed by a processor, are configurable to cause the processor to perform operations comprising:
    generating, by a first component in a distributed system, a first interaction identifier based on:
        a component identifier of the first component; and
        data to be shared with a second component;
    storing the first interaction identifier in an interaction data store of the first component;
    sending a request to the second component, the request including the component identifier of the first component, the first interaction identifier, and the data to be shared with the second component;
    creating a graph node in an interaction relationship data store based on the first interaction identifier, the interaction relationship data store being accessible by components in the distributed system;
    receiving a response from the second component, the response including a component identifier of the second component, a second interaction identifier, and response data;
    adding a relationship edge in the interaction relationship data store, the relationship edge connecting the graph node based on the first interaction identifier with a graph node based on the second interaction identifier;
    subsequently retrieving the response data from the second component by:
        requesting an interaction identifier discovery uniform resource locator (URL) corresponding to the second component from a component registry;
        requesting a shared secret corresponding to the second component from a trust store;
        requesting the response data from the second component by submitting the second interaction identifier via the interaction identifier discovery URL corresponding to the second component;
        generating a reference interaction identifier based on the response data received from the second component; and
        comparing the reference interaction identifier and the second interaction identifier to determine an integrity of the received response data.

6. The non-transitory machine-readable storage medium of claim 5, wherein generating a first interaction identifier comprises generating a keyed cryptographic hash of the data to be shared with the second component, the keyed cryptographic hash being based on a shared secret shared between the first and second components.

7. The non-transitory machine-readable storage medium of claim 5, wherein the instructions are further configurable to cause the processor to perform further operations comprising registering the first component in a component registry by providing the component identifier of the first component, a component name of the first component, an interaction identifier discovery universal resource location (URL) of the first component, and an interaction identifier response type.

8. The non-transitory machine-readable storage medium of claim 5, wherein the instructions are further configurable to cause the processor to perform further operations comprising creating an entry corresponding to the first component in a trust store accessible by components in the distributed system, the entry including the component identifier of the first component, a shared secret, and one or more peer component identifiers, each peer component identifier being a component authorized to interact with the first component.

9. An apparatus comprising:
a processor; and
a non-transitory machine-readable storage medium that provides instructions that, if executed by the processor, are configurable to cause the apparatus to perform operations comprising:
generating, by a first component in a distributed system, a first interaction identifier based on:
a component identifier of the first component; and
data to be shared with a second component;
storing the first interaction identifier in an interaction data store of the first component;
sending a request to the second component, the request including the component identifier of the first component, the first interaction identifier, and the data to be shared with the second component;
creating a graph node in an interaction relationship data store based on the first interaction identifier, the interaction relationship data store being accessible by components in the distributed system;
receiving a response from the second component, the response including a component identifier of the second component, a second interaction identifier, and response data;
adding a relationship edge in the interaction relationship data store, the relationship edge connecting the graph node based on the first interaction identifier with a graph node based on the second interaction identifier;
subsequently retrieving the response data from the second component by:
requesting an interaction identifier discovery uniform resource locator (URL) corresponding to the second component from a component registry;
requesting a shared secret corresponding to the second component from a trust store;
requesting the response data from the second component by submitting the second interaction identifier via the interaction identifier discovery URL corresponding to the second component;
generating a reference interaction identifier based on the response data received from the second component; and
comparing the reference interaction identifier and the second interaction identifier to determine an integrity of the received response data.

10. The apparatus of claim 9, wherein generating a first interaction identifier comprises generating a keyed cryptographic hash of the data to be shared with the second component, the keyed cryptographic hash being based on a shared secret shared between the first and second components.

11. The apparatus of claim 9, wherein the instructions are further configurable to cause the processor to perform further operations comprising registering the first component in a component registry by providing the component identifier of the first component, a component name of the first component, an interaction identifier discovery universal resource location (URL) of the first component, and an interaction identifier response type.

12. The apparatus of claim 9, wherein the instructions are further configurable to cause the processor to perform further operations comprising creating an entry corresponding to the first component in a trust store accessible by components in the distributed system, the entry including the component identifier of the first component, a shared secret, and one or more peer component identifiers, each peer component identifier being a component authorized to interact with the first component.

* * * * *